(No Model.)

G. WESTINGHOUSE, Jr.
PIPE LINE.

No. 323,246. Patented July 28, 1885.

WITNESSES:

INVENTOR,
George Westinghouse Jr
BY George H. Christy
ATTORNEY.

UNITED STATES PATENT OFFICE.

GEORGE WESTINGHOUSE, JR., OF PITTSBURG, PENNSYLVANIA.

PIPE-LINE.

SPECIFICATION forming part of Letters Patent No. 323,246, dated July 28, 1885.

Application filed February 24, 1885. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered certain new and useful Improvements in Pipe-Lines, of which improvements the following is a specification.

Figure 1:
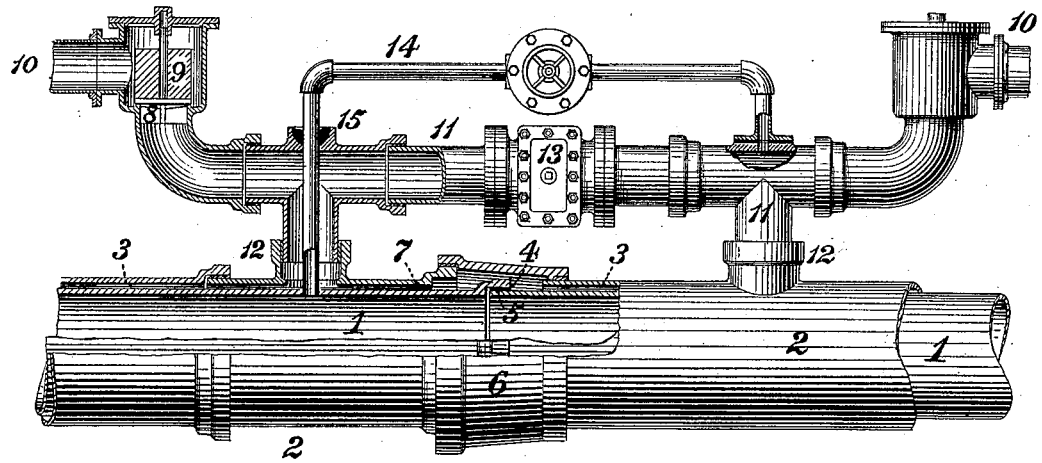
Figure 2:
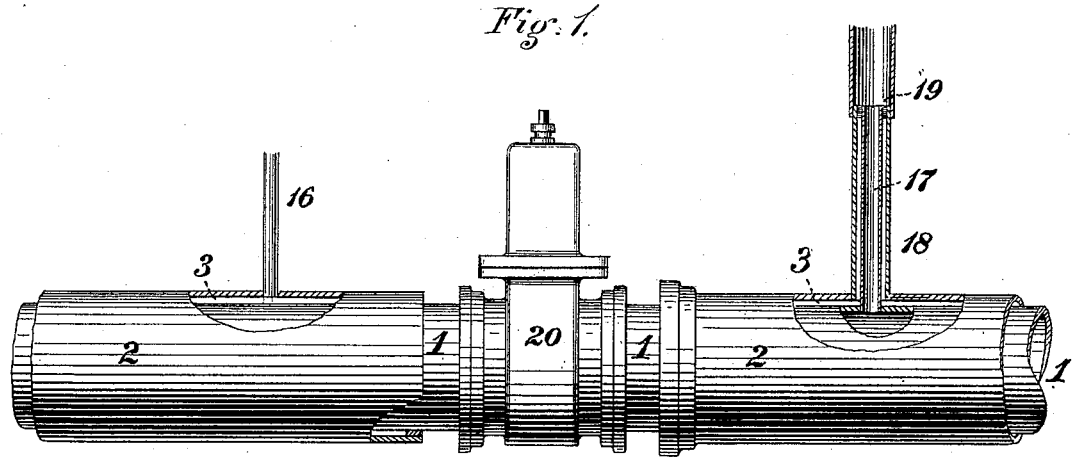

In the accompanying drawings, which make a part of this specification, Figure 1 is a side view, partly in elevation and partly in section, of a portion of a pipe-line embodying my invention, and Fig. 2 a similar view illustrating further details of construction of the same.

The object of my invention is to afford improved facilities for the construction and maintenance of pipe-lines, more particularly those designed for conveying gas under pressure; and my invention, generally stated, consists in the combination, with the outer casing of a double pipe-line, of a series of removable sleeves, each connecting two adjacent sections of the casing and surrounding a joint of the main or inner conduit.

The improvements claimed are hereinafter fully set forth.

The disastrous results of numerous explosions occasioned by the leakage of gas from mains, and its subsequent admixture with atmospheric air and accidental ignition, have demonstrated that unusual care and precaution must be observed, and the most effective and reliable safety appliances obtainable be adopted in the arrangement of laying down and connection of pipes for conveying gas under any considerable pressure, especially natural gas. The quantity of gas required to be delivered to replace other fuels renders the use of high pressure, as compared with that of ordinary gas essential, if, as is ordinarily the case, it is necessary that the gas shall be carried for long distances through the pipes or mains.

The law governing the flow of gas through pipes may be stated, in general terms, to be that to double the capacity of a pipe of given diameter four times the pressure will be required, and, inversely, that if a certain diameter of pipe will deliver a given quantity of gas, say, under one hundred pounds pressure per square inch, it will deliver one-half as much with one-quarter of the pressure, or with twenty-five pounds per square inch. Further, by reason of reduced relative frictional surface of a pipe proportionately to its increase in diameter, the quantity of gas delivered in pipes of, say, eight inches and twenty inches diameter, respectively, is as 1 to 10, and consequently, the capacity of an eight-inch pipe under one hundred pounds pressure per square inch will be only one-fifth of that of a twenty-inch pipe under one-quarter of the pressure, or twenty-five pounds per square inch. Under these conditions, and in view of the large proportionate increase of delivery capacity attainable under comparatively low pressures, it will be seen that the employment of pipes of as large a diameter as practicable is particularly desirable, and, in attaining a reasonable degree of safety, is almost indispensable.

Letters Patent of the United States No. 301,191, granted and issued to me under date of July 1, 1884, set forth a system of double pipes for the conveyance and utilization of gas under pressure, in which, among other results in operation, the explosion of a mixture of gas and air in the space between the outer and inner lines, which could be effected by a spark of electricity—as from a stroke of lightning—is guarded against by filling and keeping such space constantly filled with gas from the inner line, supplied either by leakage or by regulated delivery, or both. The inner line is further protected from the access of air and moisture, and is thereby exempt from the deteriorating action of rust.

In subsequent applications, now pending, I have described sundry devices for improving and perfecting the system above referred to, and my present invention, which relates to the same class of improvements, is designed to afford increased facilities for repairing or stopping leaks, as well as to promote the employment of inner and outer pipes of larger diameter than heretofore in the lines.

In the practice of my invention I provide, as in my Patent No. 301,191, before referred to, an inner line or main conduit, 1, through which gas is conveyed at high pressure, and an outer casing, 2, inclosing the main 1, the space between the inner and outer lines forming a series of compartments, 3, which are kept constantly charged with low-pressure gas, the supply being maintained either by leakage or by a delivery, either with or without regulation, through communicating pipes or openings.

The inner line or main conduit 1 is composed of sections of pipe of as large diameter as desired, and the same may be either of cast or wrought iron, as preferred.

The connection of the sections of the inner line may be effected by detachable coupling-sockets, either screwed or otherwise, of any approved form, or, as shown, by sockets 4, formed on the ends of the sections which receive the plain ends of the adjacent sections, the joints being made tight by lead or other suitable packing, 5, driven into the socket and calked in the usual manner.

The sections of the outer casing, 2, which, being designed to resist only a comparatively low pressure, may be of cast-iron, are connected one to the other at different desired points by removable coupling-sleeves 6, each of which surrounds a joint of the inner line, 1, so that when detached from the outer casing complete and unobstructed access is afforded to the joint of the inner line which it incloses.

The joints of the sleeves 6 are packed with any soft material which is easily removable—as a metal or composition which is fusible at a lower temperature than the packing of the inner line—and which is adapted to resist the low pressure of gas maintained in the compartments 3, and said compartments are separated one from another by rings or partitions 7, of lead or other material, fitting tightly between the inner and outer pipe-sections, adjacent to either or both ends of the sleeves 6.

The provision of the removable sleeves on the outer casing greatly facilitates the laying of the line and providing for desired curvature therein, and the formation of tight and perfect joints in the inner conduit; and the sleeves can be readily removed and replaced, as desired, for the examination or repair of the joints from time to time, as may be deemed necessary or desirable.

Each compartment of the outer casing is preferably provided with a safety or relief valve, 8, loaded by a weight, 9, or spring, so as to limit the pressure in the compartment to a determined safe degree, and discharging through a vent-pipe, 10, the opening of which is located in such position as to admit of the escape of gas without liability to accident therefrom; and the several compartments 3 may be connected by communicating pipes 11, secured to nozzles or flanges 12, on the outer casing, and carrying the chests of the relief-valves 8.

Gate or stop valves 13, located in the communicating pipes 11, enable communication between the compartments to be cut off as required, and where the partitions between the compartments are employed on one side only of the joints of the inner line, as shown in Fig. 1, said valves serve, when closed, to prevent the escape of gas from the compartments when the sleeves 6 are removed. A regulated supply of gas from the inner line to the compartments of the outer casing may also be conveniently afforded through the pipes 11, by means of low-pressure supply-pipes 14, which communicate at one end with the inner line, and, passing through packed or leaded sockets 15 in the pipes 11, open at their opposite ends into said pipes. The pipes 14 are provided with proper regulating-valves, operated either automatically or by hand. House service-pipes 16 may be connected to the outer casing; but where the outer casing is employed only to receive and carry off leakage from the inner line they are connected to the latter; and further, in such cases the relief-valves carry only a very light load, or they may be dispensed with, and a loose material, offering only a slight resistance to the passage of gas, may be substituted.

In order to enable the connection of supply-pipes for gas-regulators, house service, &c., to be made to the inner line without liability to leakage from the action of independent expansion and contraction of the inner and outer lines, the supply-pipes 17, which lead from the inner line 1, are inclosed within casing-pipes 18 of slightly larger diameter connected to the outer casing and extending freely outwardly therefrom for a short distance. The outer end of the pipe 18 is connected by a partition, 19, of lead or other material making a tight joint, with the pipe 17, which thence continues to its desired point of delivery, and the elasticity of the pipes 17 and 18 prevents any looseness or leakage being occasioned by the expansion and contraction of the inner and outer casings. Gate or stop valves 20 may be provided at desired points in the inner line, and said valves may be inclosed in and protected by gas-tight casings provided with means for actuating the valves from the exterior thereof, as fully set forth in a separate application for Letters Patent by me.

I claim herein as my invention—

1. In a double pipe-line system having an inner or main conduit adapted for the conveyance of gas under high pressure, and an outer casing containing gas at lower pressure, the combination, with the pipe-sections, of a series of detachable coupling-sleeves, each connecting two adjacent casing-sections and surrounding a joint of the inner line, and a series of partitions, each fitting tightly between the inner and outer lines adjacent to the couplings, and forming separate compartments between the same, substantially as set forth.

2. In a double pipe-line system of the class described, the combination of an inner line, an outer casing having its sections connected by detachable coupling-sleeves, each surrounding a joint of the inner line, a partition interposed between two compartments of the casing adjacent to a coupling-sleeve, and a communicating pipe connecting the compartments on opposite sides of said partition, substantially as set forth.

3. In a double pipe-line system of the class described, the combination of an inner line, an outer casing divided into compartments and having its sections connected by detachable coupling-sleeves, each surrounding a joint of the inner line, a communicating pipe connecting two of said compartments on opposite sides of a coupling-sleeve, and a relief-valve and vent-pipe leading out of said communicating pipe, substantially as set forth.

In testimony whereof I have hereunto set my hand.

GEO. WESTINGHOUSE, JR.

Witnesses:
J. SNOWDEN BELL,
R. H. WHITTLESEY.